US012088342B2

(12) United States Patent
Nagesh et al.

(10) Patent No.: US 12,088,342 B2
(45) Date of Patent: Sep. 10, 2024

(54) DYNAMIC TRANSPORT NETWORK SLICING FOR CONVERGED BROADBAND ACCESS

(71) Applicant: Radisys Corporation, Hillsboro, OR (US)

(72) Inventors: Subramanya Bhatkal Nagesh, Karnataka (IN); Rajendra Prasad Kodaypak, Hillsboro, OR (US)

(73) Assignee: Radisys Corporation, Hillsboro, OR (US)

( * ) Notice: Subject to any disclaimer, the term of this patent is extended or adjusted under 35 U.S.C. 154(b) by 93 days.

(21) Appl. No.: 18/063,069

(22) Filed: Dec. 7, 2022

(65) Prior Publication Data
US 2024/0195504 A1   Jun. 13, 2024

(51) Int. Cl.
| H04B 10/00 | (2013.01) |
| H04B 10/2575 | (2013.01) |
| H04B 10/27 | (2013.01) |
| H04L 12/46 | (2006.01) |
| H04Q 11/00 | (2006.01) |
| H04J 14/00 | (2006.01) |

(52) U.S. Cl.
CPC ....... *H04B 10/25753* (2013.01); *H04B 10/27* (2013.01); *H04L 12/4641* (2013.01); *H04Q 11/0062* (2013.01); *H04Q 2011/0086* (2013.01)

(58) Field of Classification Search
CPC ........ H04B 10/25752; H04B 10/25753; H04B 10/25754; H04B 10/25758
See application file for complete search history.

(56) References Cited

U.S. PATENT DOCUMENTS

2020/0322052 A1* 10/2020 Yigit ..................... H04B 10/27

* cited by examiner

*Primary Examiner* — Daniel G Dobson
(74) *Attorney, Agent, or Firm* — Stoel Rives LLP

(57) ABSTRACT

A transport domain orchestrator (TDO) in a 5G network provides for dynamic configuration of a transport network resource (e.g., ports) and of a corresponding set of VLAN IDs to support a 5G service within a corresponding passive optical network (PON) transport network slice. The TDO, in response to a query in connection with establishing the 5G service, determines PON ports available in the PON to support the 5G service within the corresponding PON transport network slice; allocates the transport network resource for the corresponding PON transport network slice; determines the corresponding set of VLAN IDs for the 5G service, in which the corresponding set of VLAN IDs map the 5G service to the corresponding PON transport network slice and to the set of PON ports; and configures the PON to support the 5G service in the corresponding PON transport network slice, identified by the corresponding set of VLAN IDs.

22 Claims, 16 Drawing Sheets

| | | Services - N (5) | | | | |
|---|---|---|---|---|---|---|
| | | eMBB | URLLC | Massive IoT | CV2X | Public Safety |
| | | 1 | 2 | 3 | 4 | 5 |
| | 1 | 1 | 2 | 3 | 4 | 5 |
| | 2 | 6 | 7 | 8 | 9 | 10 |
| | 3 | 11 | 12 | 13 | 14 | 15 |
| | 4 | 16 | 17 | 18 | 19 | 20 |
| | 5 | 21 | 22 | 23 | 24 | 25 |
| | 6 | 26 | 27 | 28 | 29 | 30 |
| | 7 | 31 | 32 | 33 | 34 | 35 |
| | 8 | 36 | 37 | 38 | 39 | 40 |
| Slices M (20) | 9 | 41 | 42 | 43 | 44 | 45 |
| | 10 | 46 | 47 | 48 | 49 | 50 |
| | 11 | 51 | 52 | 53 | 54 | 55 |
| | 12 | 56 | 57 | 58 | 59 | 60 |
| | 13 | 61 | 62 | 63 | 64 | 65 |
| | 14 | 66 | 67 | 68 | 69 | 70 |
| | 15 | 71 | 72 | 73 | 74 | 75 |
| | 16 | 76 | 77 | 78 | 79 | 80 |
| | 17 | 81 | 82 | 83 | 84 | 85 |
| | 18 | 86 | 87 | 88 | 89 | 90 |
| | 19 | 91 | 92 | 93 | 94 | 95 |
| | 20 | 96 | 97 | 98 | 99 | 100 |

FIG. 6

| Slice-Service | PON Ports | PON Capacity | Switch Capacity | NNI Ports | VLANs |
|---|---|---|---|---|---|
| MIoT | 1 | 40G | 100G | 100G*1 | 1-1000 |
| | 2 | | | | |
| | 3 | | | | |
| | 4 | | | | |
| URLLC | 5 | 40G | 100G | 100G*1 | 1001-2000 |
| | 6 | | | | |
| | 7 | | | | |
| | 8 | | | | |
| eMBB | 9 | 60G | 75G | 25*3 | 2001-3000 |
| | 10 | | | | |
| | 11 | | | | |
| | 12 | | | | |
| | 13 | | | | |
| | 14 | | | | |
| CV2X | 15 | 20G | 20G | 10*2 | 3001-4000 |
| | 16 | | | | |
| free ports | | | | 25*3 | |

FIG. 7

| Customer | PDN Ports | PDN Capacity | Switch Capacity | NNI Ports | | VLANs | Service | Customer VLANs |
|---|---|---|---|---|---|---|---|---|
| 1 | 1<br>2<br>3<br>4 | 40G | 100G | 100G*1 | | 1-1000 | mIOT<br>eMBB<br>uRLLC<br>CV2X<br>Public Safety | 1-200<br>201-400<br>401-600<br>601-800<br>801-1000 |
| 2 | 5<br>6<br>7<br>8 | 40G | 100G | 100G*1 | | 1001-2000 | mIOT<br>eMBB<br>uRLLC<br>CV2X<br>Public Safety | 1001-1200<br>1201-1400<br>1401-1600<br>1601-1800<br>1801-2000 |
| 3 | 9<br>10<br>11<br>12<br>13<br>14 | 60G | 75G | 25*3 | | 2001-3000 | mIOT<br>eMBB<br>uRLLC<br>CV2X<br>Public Safety | 2001-2200<br>2201-2400<br>2401-2600<br>2601-2800<br>2801-3000 |
| 4 | 15<br>16 | 20G | 20G | 10*2 | | 3001-4000 | mIOT<br>eMBB<br>uRLLC<br>CV2X<br>Public Safety | 3001-3200<br>3201-3400<br>3401-3600<br>3601-3800<br>3801-4000 |
| | free ports | | | 25*3 | | | | |

FIG. 8

| RegionX OLT1 | | | | | | |
|---|---|---|---|---|---|---|
| PON Ports | PON Capacity | Switch Capacity | NNI Ports | VLANs (4K limit is due to 12 bits in the header) | Service | Provider X VLANs | Provider Y VLANs |
| Group #1 | | | | | | | |
| 1 | 80G | 200G | 100*2 | 0001-2000 | mIOT | 1-200 | 1001-1200 |
| 2 | | | | | eMBB | 201-400 | 1201-1400 |
| 3 | | | | | uRLLC | 401-600 | 1401-1600 |
| 4 | | | | | CV2X | 601-800 | 1601-1800 |
| 5 | | | | | Public Safety | 801-1000 | 1801-2000 |
| 6 | | | | | | | |
| 7 | | | | | | | |
| 8 | | | | | | | |
| Group #2 | | | | | | | |
| 9 | 80G | 150G | 25*6 | 2001-4000 | mIOT | 2001-2200 | 3001-3200 |
| 10 | | | | | eMBB | 2201-2400 | 3201-3400 |
| 11 | | | | | uRLLC | 2401-2600 | 3401-3600 |
| 12 | | | | | CV2X | 2601-2800 | 3601-3800 |
| 13 | | | | | Public Safety | 2801-3000 | 3801-4000 |
| 14 | | | | | | | |
| 15 | | | | | | | |
| 16 | | | | | | | |

| Region(X)/Vendor(Y)/OLT(Z) | | | | | VLANs (4K limit is due to 12 bits in the header) | Service |
|---|---|---|---|---|---|---|
| Customers | PON Ports | PON Capacity | Switch Capacity | NMI Ports | | |
| 1-410 | 1　2　3　4　5　6　7　8 | 80G | 200G | 100*2 | 0001-2050 | mIOT eMBB uRLLC CV2X Public Safety |
| 411-819 | 9　10　11　12　13　14　15　16 | 80G | 150G | 25*6 | 2051-4095 | mIOT eMBB uRLLC CV2X Public Safety |

FIG. 11

| Region(X)/Vendor(Y)/OLT (Z) | | | | | | VLANs (4K limit is due to 12 bits in the header) | Service |
|---|---|---|---|---|---|---|---|
| Customers /Slices | PON Ports | PON Capacity | Switch Capacity | NNI Ports | | | |
| 1-205 | 1<br>2<br>3<br>4<br>5<br>6<br>7<br>8 | 80G | 200G | 100*2 | | 0001-1025 | mIOT<br>eMBB<br>uRLLC<br>CV2X<br>Public Safety |
| 206-410 | 9<br>10<br>11<br>12<br>13<br>14<br>15<br>16 | 80G | 150G | 25*6 | | 1026-2050 | mIOT<br>eMBB<br>uRLLC<br>CV2X<br>Public Safety |

| Region(X)/Vendor(Y)/OLT (A) | | | | | | VLANs (4K limit is due to 12 bits in the header) | Service |
|---|---|---|---|---|---|---|---|
| Customers /Slices | PON Ports | PON Capacity | Switch Capacity | NNI Ports | | | |
| 411-615 | 1<br>2<br>3<br>4<br>5<br>6<br>7<br>8 | 80G | 150G | 25*6 | | 2051-3075 | mIOT<br>eMBB<br>uRLLC<br>CV2X<br>Public Safety |
| 616-819 | 9<br>10<br>11<br>12<br>13<br>14<br>15<br>16 | 80G | 150G | 25*6 | | 3076-4095 | mIOT<br>eMBB<br>uRLLC<br>CV2X<br>Public Safety |

FIG. 12

| Customer | Slice ID | Service | VLAN | Notes |
|---|---|---|---|---|
| 1 | 1 | 1 | VLAN 1 | Each Service is tagged with a unique VLAN. All services belong to a single Slice ID. |
| 1 | 1 | 2 | VLAN 2 | |
| 1 | 1 | 3 | VLAN 3 | |
| 1 | 1 | 4 | VLAN 4 | |
| 1 | 1 | 5 | VLAN 5 | |

| Customer | Slice ID | Service | VLAN | Notes |
|---|---|---|---|---|
| 1 | 2 | 1 | VLAN 6 | A single Customer with two Slices (ID# 1 & 2). All services within a second slice have unique VLANs tagged. |
| 1 | 2 | 2 | VLAN 7 | |
| 1 | 2 | 3 | VLAN 8 | |
| 1 | 2 | 4 | VLAN 9 | |
| 1 | 2 | 5 | VLAN 10 | |

FIG. 13

| Customer | Slice ID | Service | VLAN (Slice) | VLAN (Service) |
|---|---|---|---|---|
| 1 | 1 | 1 | VLAN 1 | VLAN 1 |
| 1 | 1 | 2 | VLAN 1 | VLAN 2 |
| 1 | 1 | 3 | VLAN 1 | VLAN 3 |
| 1 | 1 | 4 | VLAN 1 | VLAN 4 |
| 1 | 1 | 5 | VLAN 1 | VLAN 5 |

| Customer | Slice | Service | VLAN (Slice) | VLAN (Service) |
|---|---|---|---|---|
| 1 | 2 | 1 | VLAN 2 | VLAN 1 |
| 1 | 2 | 2 | VLAN 2 | VLAN 2 |
| 1 | 2 | 3 | VLAN 2 | VLAN 3 |
| 1 | 2 | 4 | VLAN 2 | VLAN 4 |
| 1 | 2 | 5 | VLAN 2 | VLAN 5 |

FIG. 14

DYNAMIC TRANSPORT NETWORK SLICING FOR CONVERGED BROADBAND ACCESS

TECHNICAL FIELD

This application relates generally to transport network slicing and, more particularly, to VLAN tagging for transport network slicing.

BACKGROUND INFORMATION

Wireless mobile communication technology uses various standards and protocols to transmit data between a base station and a wireless mobile device. Wireless communication system standards and protocols can include the 3rd Generation Partnership Project (3G PP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi®.

In 3GPP radio access networks (RANs) in LTE systems, the base station can include a RAN node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next-generation Node B or g Node B (gNB)).

RANs use a radio access technology (RAT) to communicate between the RAN node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

An Open Radio Access Network (O-RAN) is a disaggregated approach to deploying mobile fronthaul and midhaul networks built on cloud native principles. O-RAN is an evolution of the Next Generation RAN (NG-RAN) architecture, first introduced by the GSMA's 3GPP in its release 15 (5G version 1) technical specification TS 38.401. The O-RAN Alliance formed to undertake the advancement of NG-RAN philosophies, expanding on the scope of what was originally outlined by the 3GPP. An O-RAN includes an O-RAN radio unit (O-RU), an O-RAN distributed unit (O-DU), and an O-RAN central unit (O-CU).

The latest 5G cellular networking standards support new use cases such as enhanced mobile broadband (eMBB), ultra-reliable low latency communications (URLLC), massive machine type communications (mMTC), cellular vehicle to anything (CV2X) communications and several others that will benefit the industrial revolution into the next decade. Different industry verticals will leverage 5G O-RAN enabled connectivity and its benefits in different ways. Mobile network operators will seek to deliver unique service-level agreements (SLAs) to their customers based on specific use cases and their end-to-end emerging cloud native network infrastructure deployments while supporting interworking with other legacy and emerging access technologies.

The transport network plays a critical role in a disaggregated open RAN connectivity model. With the flexibility O-RAN offers to design 5G SA network solutions, the mobile xhaul (i.e., fronthaul, midhaul, and backhaul) transport becomes pivotal to the end users QoS/QoE. Traditional transport connectivity models that enabled previous generation of broadband access technologies no longer provide the flexibility for supporting surging demands of data-intensive applications emerging across both wireless and wireline networking domains.

SUMMARY OF THE DISCLOSURE 5G networks enabled with software-defined disaggregated models within the radio access networking domain employ programmable transport solutions to connect and transfer the mobile broadband data traffic with high-speed, ultra low latency, massive connectivity, reliability, and stringent application requirements to meet industrial verticals with disparate demands. The current transport network solutions and aggregation methods—used in connecting cell-sites between the radio and baseband network functions as well as switching offices and local/regional/national data centers-largely rely on static methods of capacity configuration, provisioning and reactive mode of operations for troubleshooting as well as service outages. They do not consider adaptive network and processes, location dependent traffic and service dynamics, failover mechanisms during disaster conditions and disparate types of application flows emerging from a multitude of devices as well as the programmable cloud native RAN functions that are targeted for large scale 5G/5G+ deployments within a global mobile network operator community.

Passive optical network (PON) transport network slicing is a technology that allows for the creation of multiple virtual networks on top of a single physical network infrastructure. This allows service providers to offer customized services to different types of users, such as businesses and residential customers, on a single network. In a 5G network, PON transport network slicing allows for the allocation of specific portions of the network's resources, such as bandwidth and processing power, to different users or services. This allows for more efficient use of the network's resources and allows service providers to offer a wider range of services to their customers. PON transport network slicing works by dividing the network into multiple virtual slices, each of which can be configured and managed independently. This allows service providers to create customized networks for different users or services, and to allocate the necessary resources to each slice as needed. For example, a service provider might create one slice for high-bandwidth services such as video streaming, and another slice for low-bandwidth services such as email. The provider can then allocate more bandwidth and processing power to the slice for video streaming, to ensure that it can handle the demands of high-bandwidth services. Overall, PON transport network slicing is a technology for enabling the efficient and flexible use of 5G networks, and for allowing service providers to offer a wider range of services to their customers.

The present inventors recognized that there is a need to develop innovative high-speed optical access networking solutions such as PON slicing in the transport domain and its life cycle management to enable service providers to drive 5G monetization, achieve operational efficiencies and optimized ROI, as well as reducing the cost and the risk of innovation. PON transport network slicing is a means to enable programmable, flexible and scalable design that can enable intelligent aggregation of broadband data traffic across disparate wireless and wireline access domains with unique service-level differentiation, offloading on-demand. The transport slicing solution also offers a means to enable dynamic slice-pairing with the RAN and Core network orchestrator resources exchanging their slice analytics with standard APIs based on their availability.

This disclosure, therefore, describes examples of dynamic and reconfigurable transport network slicing techniques enabling 5G O-RAN networks to flexibly interconnect with peer 5G core network functions on-demand in an end-to-end manner while delivering optimized network and services experience in a converged broadband connectivity model. Passive Optical Network (PON) transport slicing management in a converged broadband access network is critical to ensuring the next-generation digital transformation solutions and their assets are designed, deployed, utilized and maintained to deliver the best outcomes for residential, enterprise, and wholesale customers and the connected society.

The dynamic orchestration of mobile xhaul transport network slicing that enables disaggregated O-RAN design and deployment models is critical to ensuring seamless 5G network functionality and services continuity during mobility. Transport network slices that connect the various O-RAN network functions and controllers with a mix of PON technologies need to be coordinated in terms of their architecture, interface design, business and customer centric segmentation, dynamic VLAN allocation and mapping, service profiles provisioning for slices, security, and bandwidth management.

The present applicant, Radisys Corporation, provides open, disaggregated, and virtualized/containerized open telecom solutions to meet varying demands and needs of the global service provider community. With this proposed dynamic transport slicing method and VLAN assignment scheme for slice-service pairing, Radisys brings an innovative approach in designing next generation disaggregated broadband access networks that can enable 5G mobility services across various industry verticals with unique SLA requirements and delivering on the end user's quality of experience with measurable data analytics at the transport slice level. Radisys is providing standards-based, software-defined, disaggregated and innovative telecom solutions to meet varying connectivity demands from global service providers. Radisys provides software solutions in the transport domain that can enable global operators to successfully drive cost-effective delivery of rich innovative broadband services with data driven intelligence.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 6 is a table showing a VLAN mapping, in accordance with one embodiment.

FIG. 7 is a table showing a VLAN mapping, in accordance with one embodiment.

FIG. 8 is a table showing a VLAN mapping, in accordance with one embodiment.

FIG. 9 is a table showing a VLAN mapping, in accordance with one embodiment.

FIG. 10 is a table showing a VLAN mapping, in accordance with one embodiment.

FIG. 11 is a table showing a VLAN mapping, in accordance with one embodiment.

FIG. 12 is a table showing a VLAN mapping, in accordance with one embodiment.

FIG. 13 is a table showing an example VLAN allocation, in accordance with one embodiment.

FIG. 14 is a table showing an example VLAN allocation, in accordance with one embodiment.

DETAILED DESCRIPTION OF EMBODIMENTS

Figure 1:
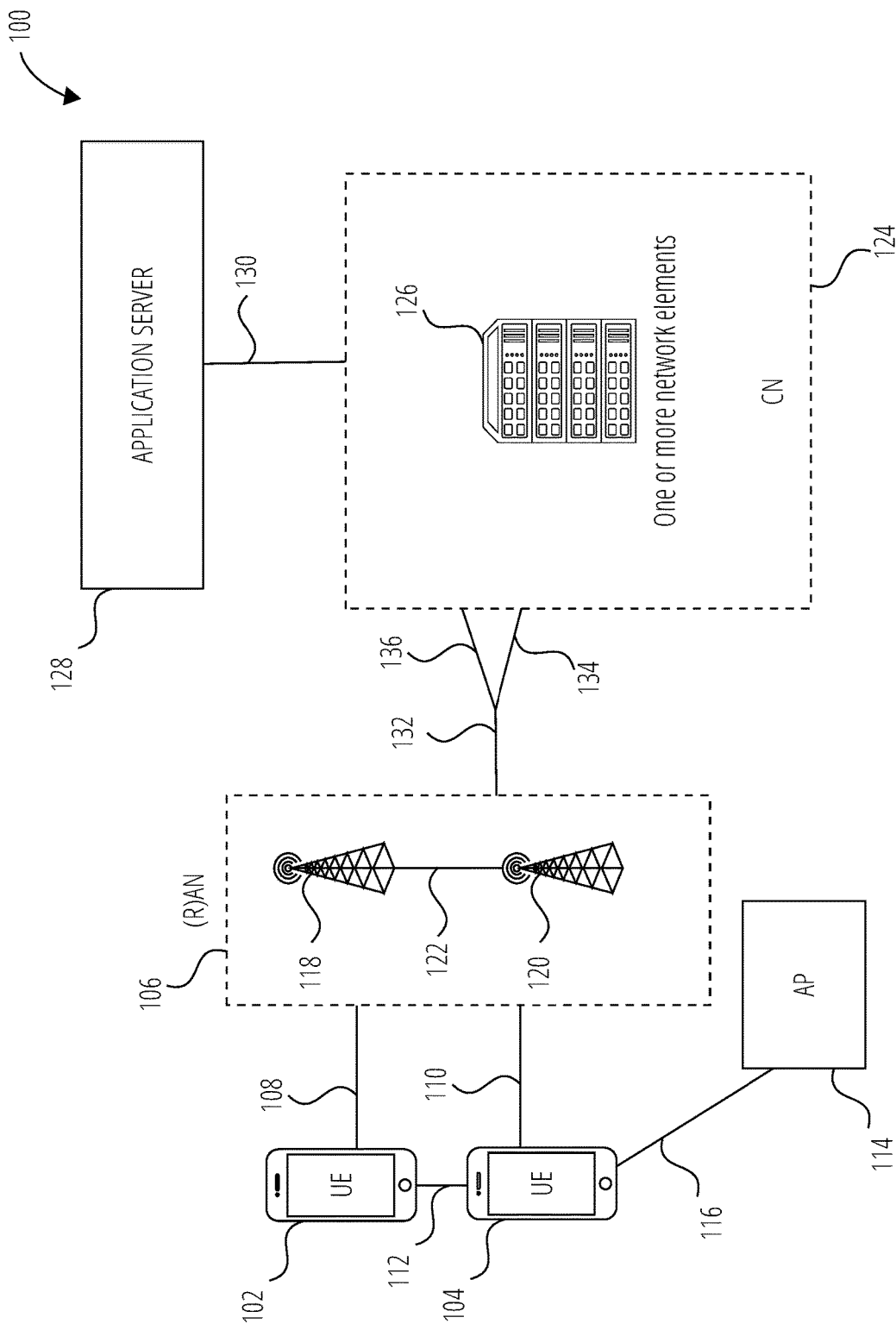
FIG. 1 is a block diagram of a wireless communications system, in accordance with one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, system 100 includes UE 102 and UE 104. In this example, UE 102 and UE 104 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, UE 102 and/or UE 104 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the internet infrastructure), with short-lived connections. The IoT UEs may execute background applications (e.g., keep-alive messages, status updates, etc.) to facilitate the connections of the IoT network.

UE 102 and UE 104 may be configured to connect, for example, communicatively couple, with an access node or radio access node (shown as (R)AN 106). In embodiments, (R)AN 106 may be an NG-RAN or a 5G RAN, an E-UTRAN, or a legacy RAN, such as a UTRAN or GERAN. As used herein, the term "NG-RAN" or the like may refer to a (R)AN 106 that operates in an NR or 5G system, and the term "E-UTRAN" or the like may refer to a (R)AN 106 that operates in an LTE or 4G system. UE 102 and UE 104 utilize connections (or channels) (shown as connection 108 and connection 110, respectively), each of which comprises a physical communications interface or layer (discussed in further detail below).

In this example, connection 108 and connection 110 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, an NR protocol, and/or any of the other communications protocols discussed herein. In embodiments, UE 102 and UE 104 may directly exchange communication data via a ProSe interface 112. ProSe interface 112 may alternatively be referred to as a sidelink (SL) interface 110 and may comprise one or more logical channels, including, but not limited to, a PSCCH, a PSSCH, a PSDCH, and a PSBCH.

UE 104 is shown to be configured to access an AP 114 (also referred to as "WLAN node," "WLAN," "WLAN Termination," "WT," or the like) via connection 116. Connection 116 can comprise a local wireless connection, such as a connection consistent with any IEEE 802.11 protocol, wherein the AP 114 would comprise a wireless fidelity (Wi-Fi®) router. In this example, AP 114 may be connected to the internet without connecting to the core network of the wireless system (described in further detail below). In various embodiments, UE 104, (R)AN 106, and AP 114 may be configured to utilize LWA operation and/or LWIP operation. The LWA operation may involve UE 104 in RRC_CONNECTED being configured by RAN node 118 or RAN node 120 to utilize radio resources of LTE and WLAN. LWIP operation may involve UE 104 using WLAN radio resources (e.g., connection 116) via IPsec protocol tunneling to authenticate and encrypt packets (e.g., IP packets) sent over connection 116. IPsec tunneling may include encapsulating the entirety of original IP packets and adding a new packet header, thereby protecting the original header of the IP packets.

(R)AN 106 can include one or more AN nodes, such as RAN node 118 and RAN node 120, that enable the connection 108 and connection 110. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs, or TRPs, and so forth, and can comprise ground stations (e.g., terrestrial access points) or satellite stations providing coverage within a geographic area (e.g., a cell). As used herein, the term "NG-RAN node" or the like may refer to a RAN node that operates in an NR or 5G system (for example, a gNB), and the term "E-UTRAN node" or the like may refer to a RAN node that operates in an LTE or 4G system 100 (e.g., an eNB). According to various embodiments, RAN node 118 or RAN node 120 may be implemented as one or more of a dedicated physical device such as a macrocell base station, and/or a low-power base station for providing femtocells, picocells, or other like cells having smaller coverage areas, smaller user capacity, or higher bandwidth compared to macrocells.

In some embodiments, all or parts of RAN node 118 or RAN node 120 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 118 or RAN node 120); a MAC/PHY split wherein RRC, PDCP, RLC, and MAC layers, are operated by the CRAN/vBBUP and the PHY layer is operated by individual RAN nodes (e.g., RAN node 118 or RAN node 120); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 118 or RAN node 120 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in (R)AN 106 (not shown) or by a server pool in a similar manner as the CRAN/vBBUP. Additionally, or alternatively, one or more of RAN node 118 or RAN node 120 may be next-generation eNBs (ng-eNBs), which are RAN nodes that provide E-UTRA user plane and control plane protocol terminations toward UE 102 and UE 104, and are connected to a 5GC via an NG interface. In V2X scenarios one or more of RAN node 118 or RAN node 120 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, and applications/software to sense and control ongoing vehicular and pedestrian traffic. The RSU may operate on the 5.9 GHZ Direct Short Range Communications (DSRC) band to provide very low latency communications required for high-speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi® hotspot (2.4 GHz band) and/or provide connectivity to one or more cellular networks to provide uplink (UL) and downlink (DL) communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

RAN node 118 and/or RAN node 120 can terminate the air interface protocol and can be the first point of contact for UE 102 and UE 104. In some embodiments, RAN node 118 and/or RAN node 120 can fulfill various logical functions for (R)AN 106 including, but not limited to, RNC functions such as radio bearer management, uplink and downlink dynamic radio resource management and data packet scheduling, and mobility management.

In some embodiments, UE 102 and UE 104 can be configured to communicate using OFDM communication signals with each other or with RAN node 118 and/or RAN node 120 over a multicarrier communication channel in accordance with various communication techniques, such as, but not limited to, an OFDMA communication technique (e.g., for downlink communications) or an SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from RAN node 118 and/or RAN node 120 to UE 102 and UE 104, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. Several different physical downlink channels are conveyed using such resource blocks.

According to various embodiments, UE 102 and UE 104 and RAN node 118 and/or RAN node 120 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHZ to approximately 3.8 GHZ, whereas the unlicensed spectrum may include the 5 GHz band.

To operate in the unlicensed spectrum, UE 102 and UE 104 and RAN node 118 or RAN node 120 may operate using LAA, eLAA, and/or feLAA mechanisms. In these implementations, UE 102 and UE 104 and RAN node 118 or RAN node 120 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier-sensing operations may be performed according to a listen-before-talk (LBT) protocol.

LBT is a mechanism whereby equipment (for example, UE 102 and UE 104, RAN node 118 or RAN node 120, etc.) senses a medium (for example, a channel or carrier frequency) and transmits when the medium is sensed to be idle (or when a specific channel in the medium is sensed to be unoccupied). The medium-sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 102, AP 114, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15, or 20 MHz and a maximum of five CCs can be aggregated, and therefore a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC- and NAS-related activities. The other serving cells are referred to as SCells, and each SCell may provide an individual SCC for both UL and DL. The SCCs may be added and removed as required, while changing the PCC may require UE 102 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher layer signaling to UE 102 and UE 104. The PDCCH carries information about the transport format and resource allocations related to the PDSCH channel, among other things. It may also inform UE 102 and UE 104 about the transport format, resource allocation, and HARQ information related to the uplink shared channel. Typically, downlink scheduling (assigning control and shared channel resource blocks to UE 104 within a cell) may be performed at any of RAN node 118 or RAN node 120 based on channel quality information fed back from any of UE 102 and UE 104. The downlink resource assignment information may be sent on the PDCCH used for (e.g., assigned to) each of UE 102 and UE 104.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

RAN node 118 or RAN node 120 may be configured to communicate with one another via interface 122. In embodiments where system 100 is an LTE system (e.g., when CN 124 is an EPC), interface 122 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB, information about successful in sequence delivery of PDCP PDUs to a UE 102 from an SeNB for user data, information of PDCP PDUs that were not delivered to a UE 102, information about a current minimum desired buffer size at the Se NB for transmitting to the UE user data, and the like. The X2-C may provide intra-LTE access mobility functionality, including context transfers from source to target eNBs, user plane transport control, etc.; load management functionality; and inter-cell interference coordination functionality.

In embodiments where system 100 is a 5G or NR system (e.g., when CN 124 is a 5GC), interface 122 may be an Xn interface. The Xn interface is defined between two or more RAN nodes (e.g., two or more gNBs and the like) that connect to a 5GC, between a RAN node 118 (e.g., a gNB) connecting to a 5GC and an eNB, and/or between two eNBs connecting to a 5GC (e.g., CN 124). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface, and mobility support for UE 102 in a connected mode (e.g., CM-CONNECTED) including functionality to manage the UE mobility for connected mode between one or more RAN node 118 or RAN node 120. The mobility support may include context transfer from an old (source) serving RAN node 118 to new (target) serving RAN node 120, and control of user plane tunnels between old (source) serving RAN node 118 to new (target) serving RAN node 120. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

(R)AN 106 is shown to be communicatively coupled to a core network in this embodiment, CN 124. CN 124 may comprise one or more network elements 126, which are configured to offer various data and telecommunications services to customers/subscribers (e.g., users of UE 102 and UE 104) who are connected to CN 124 via (R)AN 106. The components of CN 124 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of CN 124 may be referred to as a network slice, and a logical instantiation of a portion of CN 124 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 128 may be an element offering applications that use IP bearer resources with the core network (e.g., UMTS PS domain, LTE PS data services, etc.). The application server 128 can also be configured to support one or more communication services (e.g., VOIP sessions, PTT sessions, group communication sessions, social networking services, etc.) for UE 102 and UE 104 via the EPC. Application server 128 may communicate with CN 124 through an IP communications interface 130.

In embodiments, CN 124 may be a 5GC. As described in 3GPP TS 23.501, 5G CN 124 includes an access and mobility management function (AMF), a user plane function (UPF), a session management function (SMF), an authentication server function (AUSF), a network exposure function (NEF), a unified data management (UDM), a unified data repository (UDR), a short message service function (SMSF), a non-3GPP interworking function (N3IWF), a policy control function (PCF), an NF repository function (NRF), a network slice selection function (NSSF), an application function (AF), or other 5G core network functions. A charging function (CHF) introduced in the 5G system architecture allows charging services to be offered in connection with an operations support system and a business support system (OSS/BSS).

(R)AN 106 may be connected with CN 124 via an NG interface 132. In embodiments, NG interface 132 may be split into two parts, an NG user plane (NG-U) interface 134, which carries traffic data between RAN node 118 or RAN node 120 and a UPF, and NG control plane (NG-C) interface 136, which is a signaling interface between RAN node 118 or RAN node 120 and AMFs.

In embodiments, CN 124 may be a 5G CN, while in other embodiments, CN 124 may be an EPC). Where CN 124 is an EPC, (R)AN 106 may be connected with CN 124 via an S1 interface 132. In embodiments, S1 interface 132 may be split into two parts, an S1 user plane (S1-U) interface 134, which carries traffic data between RAN node 118 or RAN node 120 and S-GW, and an S1-MME control plane interface 136, which is a signaling interface between RAN node 118 or RAN node 120 and MMEs.

Figure 2:
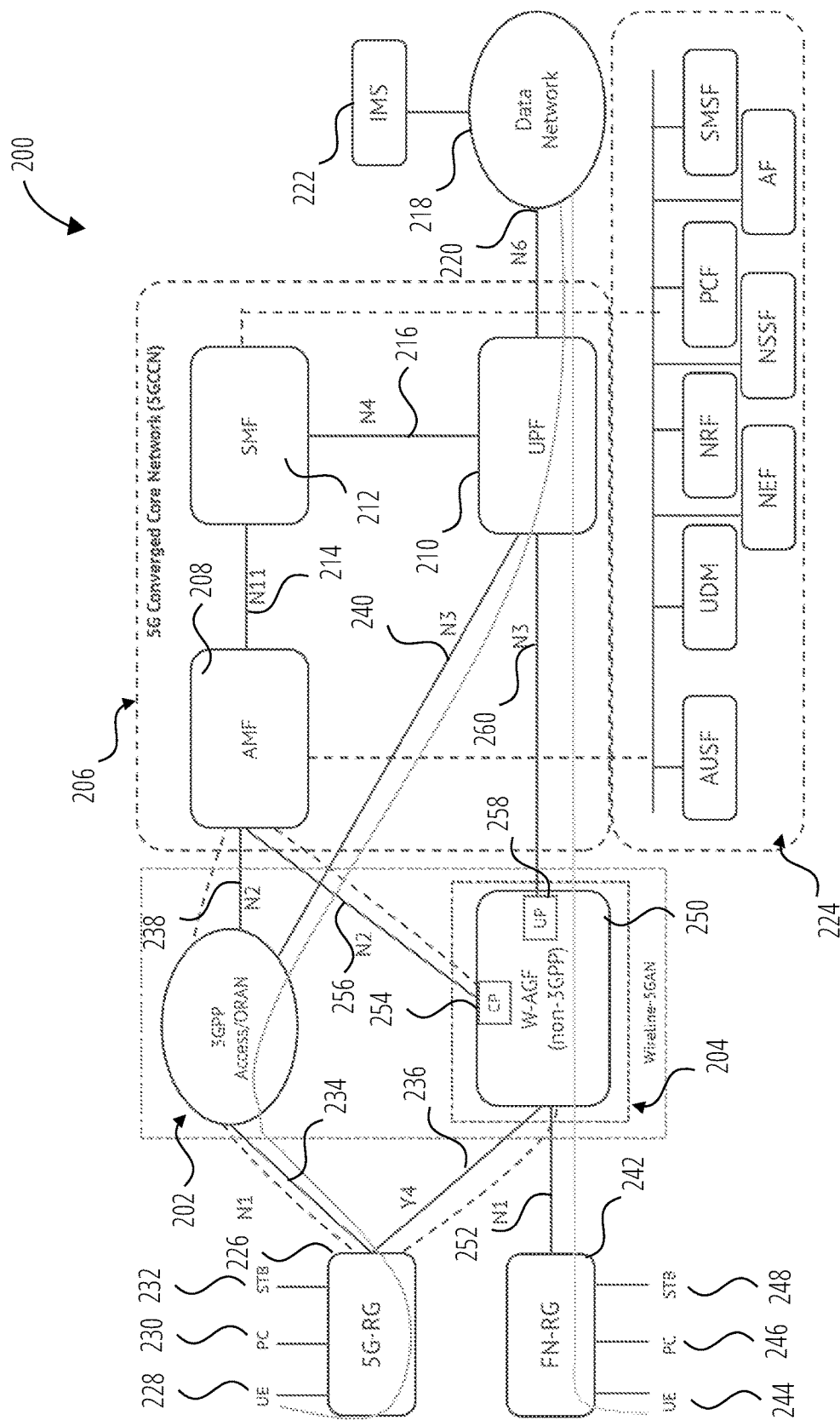
FIG. 2 is a block diagram of a converged broadband system architecture, in accordance with one embodiment.

FIG. 2 shows an example of a converged broadband system architecture 200, which includes a 3GPP 5G (NG-RAN or O-RAN) wireless broadband access node 202 and a wireline 5G broadband access node 204, both of which terminate on a 5G converged core network (5GCCN) 206. While wireless and wireline broadband access technologies continue to emerge and evolve, infrastructure of 5GCCN 206 brings these two disparate access domains together with the intent of simplifying and delivering a unified service experience to the end user/device.

5GCCN 206 includes an AMF 208, UPF 210, and SMF 212. AMF 208 and SMF 212 are communicatively coupled via a N11 interface 214. SMF 212 and UPF 210 are communicatively coupled via an N4 interface 216. UPF 210 is coupled to a data network 218, outside of 5GCCN 206, via an N6 interface 220. An IP multimedia subsystem (IMS) 222 for delivering IP multimedia services is also shown in this example. For completeness, other 5G network functions 224 are also shown.

A 5G residential gateway (5G-RG) 226 provides connectivity to one or more of a UE 228, PC 230 (laptop), and set-top box (STB) 232. FIG. 2 shows that 5G-RG 226 is communicatively coupled to 3GPP 5G (NG-RAN or O-RAN) wireless broadband access node 202 via a N1 interface 234. 5G-RG 226 is also coupled to wireline 5G broadband access node 204 via a Y4 interface 236. 3GPP 5G (NG-RAN or O-RAN) wireless broadband access node 202 is communicatively coupled to an AMF 208 of 5GCCN 206 via a N2 interface 238 and to a UPF 210 via a N3 interface 240.

Likewise, a fixed network residential gateway (FN-RG) 242 provides connectivity to one or more of a UE 244, PC 246, and STB 248. FN-RG 242 is communicatively coupled to a non-3GPP wireline access gateway function (W-AGF) 250 via a N1 interface 252. The wireline broadband may be supported by cable (e.g., DOCSIS), PON, or other types of wired connections. In this example, W-AGF 250 is shown with its control plane (CP) function 254 communicatively coupled to AMF 208 via a N2 interface 256, and its user plane (UP) function 258 communicatively coupled to UPF 210 via a N3 interface 260.

Figure 3:
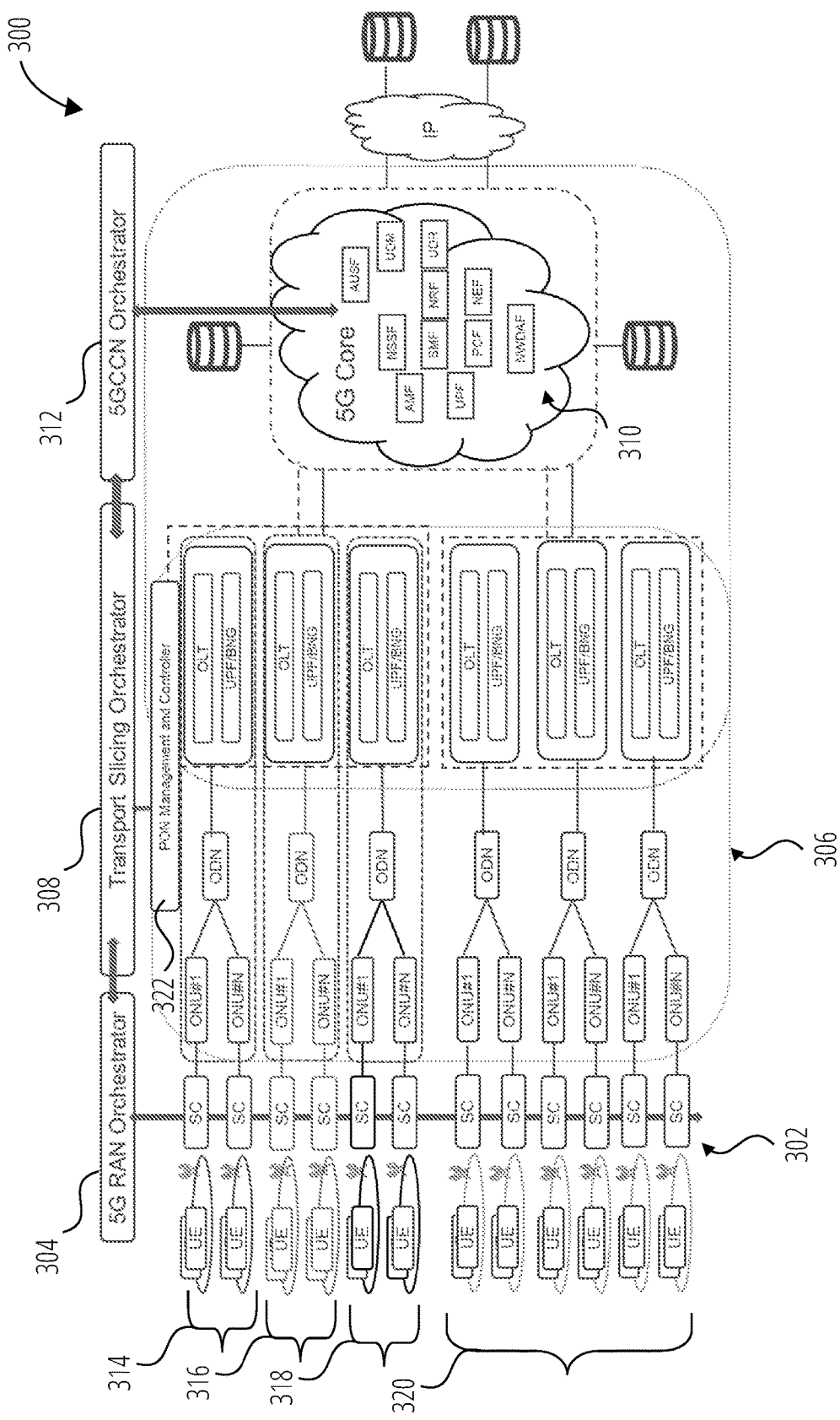
FIG. 3 is a block diagram of converged broadband system architecture, in accordance with one embodiment.

FIG. 3 shows another example of a converged broadband system architecture 300 including a 5G O-RAN small cell (SC) access network 302 coordinated by a 5G RAN orchestrator 304, a PON backhaul transport network 306 coordinated by a transport domain (slicing) orchestrator (TDO) 308, and a 5GCCN 310 coordinated by a 5GCCN orchestrator 312. In this example, different services are provided by different slices. For instance, URLLC is provided by a first slice 314, MIoT is provided by a second slice 316, public safety is provided by a third slice 318, and eMBB is provided by a fourth slice 320.

In access network 302, each SC includes an O-RU (not shown), O-DU (not shown), and O-CU (not shown). In some embodiments, each SC is located in relatively close proximity to UE endpoints, e.g., in a shopping mall or at residential locations. 5G RAN orchestrator 304 controls each SC and interfaces with TDO 308.

PON backhaul transport network 306 is a type of telecommunications network that uses passive components, such as optical splitters, to distribute optical signals from a central source to multiple endpoints. PONs are used in broadband access networks, such as those used by internet service providers, to deliver high-speed internet access to homes and businesses. They also provide a high level of security and reliability, as the passive components in the network do not require power and are resistant to interference.

In PON backhaul transport network 306, an optical line terminal (OLT) at a central office sends optical signals to an optical distribution unit (ODN), which uses an optical splitter to divide the signal into multiple paths. These paths are then carried to individual optical network units (ONUs) or optical network terminals (ONTs) at the endpoints, where the signals are converted back into electrical signals for use by the end user. In the example of FIG. 3, PON backhaul transport network 306 includes an OLT in each slice 314, 316, and 318, and three OLTs are in slice 320, but other embodiments may include a massive OLT for all the endpoints, a multiple vendor OLT in a geographic region, a software-defined OLT serving two slices, and another OLT serving other slices. PON backhaul transport network 306 also shows two ONUs for each OLT, but other embodiments may include N ONUs, e.g., where N is 32, 64, and so forth, corresponding to the number of SCs.

The OLT provides the interface between PON backhaul transport network 306 and 5GCCN 310. A UPF and a border network gateway (BNG) in the PON can be in a centralized location. The BNG acts as a gateway for all traffic into and out of the PON. It also performs functions such as authentication, traffic management, and QoS control to ensure that the traffic is routed efficiently and securely within the PON.

A PON management and controller 322 manages all the OLTs and interfaces with TDO 308 for VLAN mapping, which is described later. In the optical domain, transport is typically provided through layer 2/layer 3 communications between an ONT and an OLT/BNG, such that the VLAN mapping provides a way for differentiating each service from the other services. PON management and controller 322 manages the resources of all the four slices while obtaining analytics information from all the OLTs and exposing that information to TDO 308, thereby aggregating performance information (fault monitoring) and security information covering the slices for dynamic PON slicing orchestration.

More generally, dynamic PON slicing orchestration and mapping for allocation, deallocation, and modification of the 5G O-RAN mobile xhaul transport network resources facilitates increasing 5G mobile broadband traffic demands from consumers and enterprises across the various industrial segments. These resources are configured by the operator in terms of the PON ports per OLT, mix of vendor OLT platforms, serving regions, aggregate number of slices, VLANs, services supported in a single slice, mapping of slice-services to VLANs, and their availability, utilization, reservation, and the like.

According to some embodiments, in a 5G mobile xhaul networking architecture, TDO 308 has full visibility into the multi-vendor PON access network platforms, and the applications/services being offered to the customers. For instance, TDO 308 extracts the net available OLTs serving a given region via standards-based APIs feeding into their management systems, PON ports per vendor specific OLT platform, port types (e.g., GPON, XGS-PON, NG-PON, etc.) per OLT, PON slices per OLT, end points served per PON port, traffic carried by endpoints, services supported per slice, VLANs allocated per slice-service pair, and infrastructure performance behaviors per slice. TDO 308 further extracts the network-layer analytics based on the services supported by the underlying infrastructure. It interfaces with open standards APIs that extract the infrastructure and application layer intelligence that results from serving the end points/customers with a variety of services. It provides a correlated view of the cross-layer performance impacts and trending with threshold based alerting mechanisms to drive elastic scaling of the underlying network infrastructure resources. These data insights facilitate dynamically offloading certain traffic types based on their criticality, time of day, regional basis, etc., such that services are prioritized between the ports within a given slice and the TDO 308 may elastically scale the infrastructure based on the traffic/location dynamics.

Figure 4:
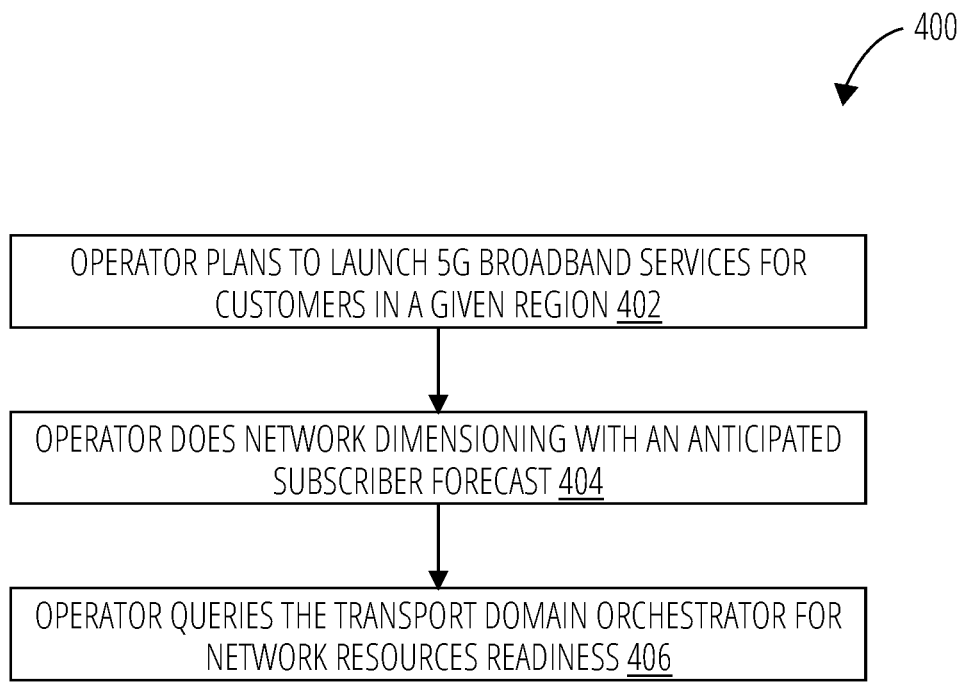
FIG. 4 is a flow diagram of a process, in accordance with one embodiment.
Figure 5:
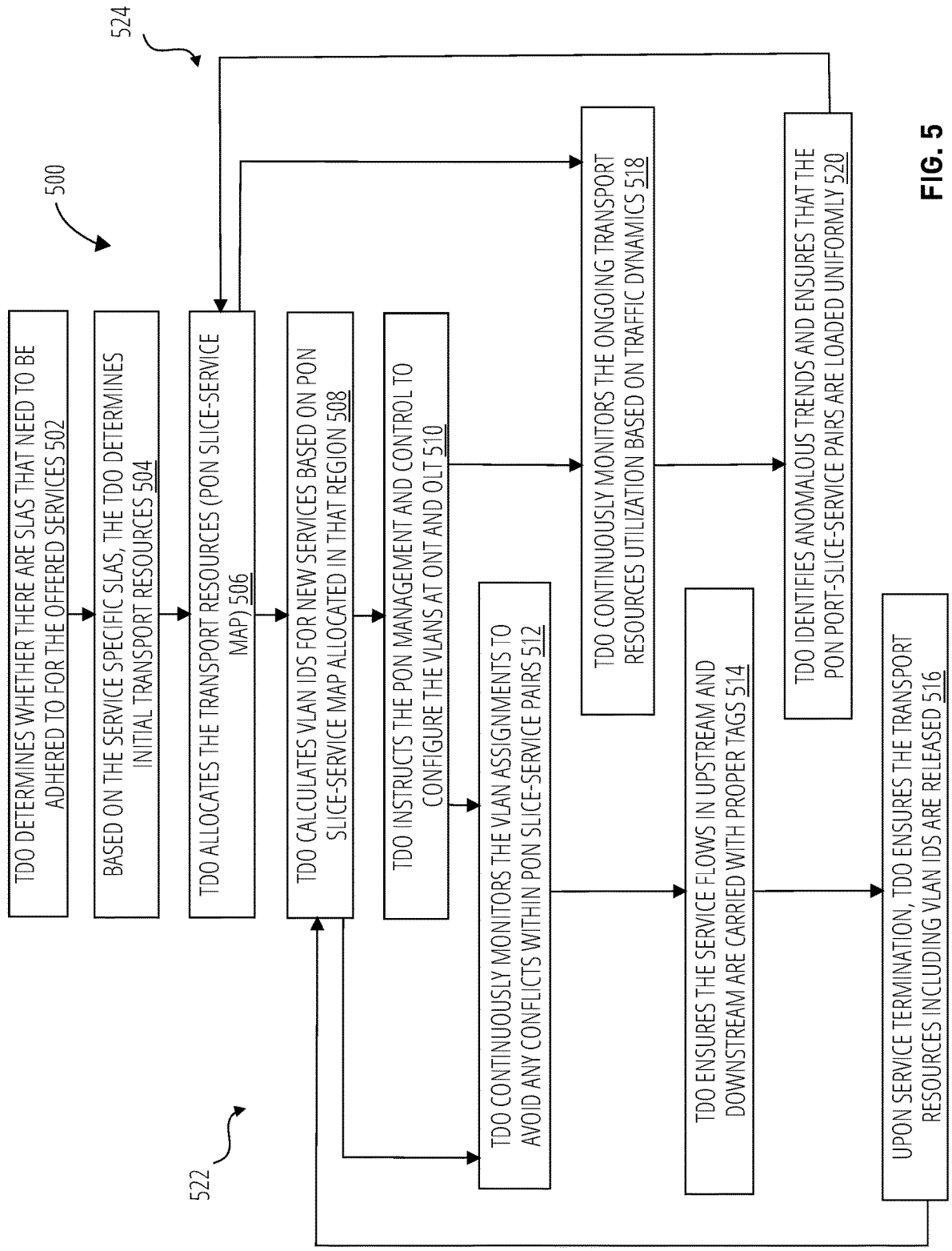
FIG. 5 is a flow diagram of a process, in accordance with one embodiment.

FIG. 4 and FIG. 5 collectively show an example of VLAN mapping. FIG. 4 shows a process performed by an operator. FIG. 5 shows a process performed by a TDO (e.g., TDO 308).

With reference to FIG. 4, process 400 initially entails planning to launch 5G broadband services for customers in a given region at block 402. Next, the operator performs network dimensioning with an anticipated subscriber forecast at block 404. Based on the forecast, the operator queries the TDO for network resources readiness at block 406.

Following process 400, in response to a query in connection with establishing the 5G service, the PON port-slice-service associated VLAN mapping and life cycle management is performed by the TDO and adapted to the demands of the programmable network. For example, FIG. 5 shows a process 500 for dynamic VLAN calculation and mapping based on the aggregate resources in the transport network that includes the total number of PON slices, services supported in each PON slice, and service type supported in a PON slice.

Initially, process 500 entails determining whether there are SLAs that need to be adhered to for the offered services at block 502. Based on the service-specific SLAs, the TDO determines initial transport resources at block 504. For instance, the number of slices is determined based on the overall network sizing and could be operator specific in each region, based on anticipated net traffic forecast (see e.g., block 404, FIG. 4). This could be a combination of fiber-to-the-home/premise (FTTH/P) as well as mobility and smartX (X is home, enterprise, vertical, and the like) traffic across multiple segments served within a given region.

Next, process 500 entails allocating the transport resources based on a logical mapping of services to a PON slice (a PON slice-service map), in which the PON slice is implemented in dedicated ports at block 506. Process 500 calculates VLAN IDs for new services based on the PON slice-service map allocated in that region at block 508. At block 510, process 500 entails instructing the PON management and control (see, e.g., PON management and controller 322, FIG. 3) to configure the VLANs at ONT and OLT.

In the present example, process 500 also includes continuous monitoring features, which are represented in a left-side loop 522 and a right-side loop 524. Left-side loop 522 generally entails monitoring and updating VLAN assignments. Right-side loop 524 generally entails monitoring and updating transport resources. These two subprocesses are described below.

With reference to left-side loop 522, once the TDO calculates the VLAN IDs at block 508 (and has initially configured them at block 510), then at block 512 process 500 entails continuously monitoring the VLAN assignments to avoid any conflicts in the logical mapping that is defined to provide slice-specific services. For instance, a conflict arises when one slice is allocated to a set of VLANs that should be used for a different slice.

Process 500 ensures the service flows in upstream and downstream directions are carried with proper tags at block 514. In the upstream, an ONU (FIG. 3) adds a tag, or it can receive tagged traffic from the SC. In the downstream, a BNG will add the tag. And at service termination, the TDO ensures the transport resources including VLAN IDs are released at block 516, at which point the IDs may reenter the pool for the calculation at block 508.

With reference to right-side loop 524, once the TDO allocates resources at block 506 (and has initially configured them at block 510), then at block 518 process 500 entails continuously monitoring the ongoing transport resources utilization based on traffic dynamics at block 518. For example, traffic dynamics include parameters such as the number of users, flows, rate shaping patterns applied to flows, packet markings, QoS, and other dynamics. Next, at block 520, process 500 identifies anomalous trends and ensures that the PON port-slice-service maps are loaded uniformly at block 520. Thus, at block 520 process 500 ensures the resources are allocated uniformly such that, for example, if there are 10 ports, those ports should have similar traffic loading utilization and CPU (infrastructure) loading. Flow then returns to block 506 for reallocation of resources.

FIG. 6-FIG. 12 shows tables representing different VLAN mapping models, according to some embodiments. These models represent dynamic approaches for calculating the VLAN IDs.

FIG. 6, for example, shows a scenario in which one VLAN represents one slice-service map. More generally, one slice may contain "N" services, which implies "N" VLANs per slice. Accordingly, a first slice with services one through N maps to VLAN 1 through N. A second slice with services N+1 through 2N maps to VLAN N+1 through 2N.

And an "M" slice with services 1 through N maps to VLAN (M−1)*(M) through M*N. Thus, the VLAN number can be calculated as follows: VLAN number=(M−1)*N+(modulo (L, N+1)), where M is the slice number, N is the number of services, and L is the service type number.

In the example of FIG. 6, there are 20 slices, and each supports five services. Specifically, the deployment supports five services: eMBB (1), URLLC (2), Massive IoT (3), CV2X (4), and Public Safety (5), where the numbers in parenthesis indicate service type number. Each service is tagged with one VLAN, i.e., each slice supports five VLANs. For slice number 5, the VLAN for Massive IOT (M=5, N=5, L=3), the VLAN number is as follows: VLAN number=(5−1)*5+(modulo(3, 6)), which is VLAN ID 23.

FIG. 7 shows an example of how VLAN allocation may be divided based on physical PON ports for one customer with a single service per PON slice. In this example, there is a 16-port OLT platform; four PON slices; four services, i.e., Massive IoT, URLLC, cMBB, and CV2X (one slice per service); and 1000 VLANs per slice. Also, in the example allocation, the PON slice capacity and network-to-network interface (NNI) ports are proportional to the number of PON ports allocated within the OLT. For instance, PON ports 1-4 are mapped to the MIoT service; PON ports 5-8 are mapped to the URLLC service; PON ports 9-14 are mapped to the eMBB service; and PON ports 15-16 are mapped to the CV2X service.

Accordingly, as shown in FIG. 7, the TDO maps a different PON transport network slice for each 5G service. Mapping a unique PON transport network slice is provided in terms of dedicated or shared ports for each 5G service type.

FIG. 8 shows an example in which multiple services are allocated per PON slice for four customers. In this example, there is a 16-port OLT platform; four PON slices with one slice per customer; five services per slice; 1000 VLANs per slice; and 200 VLANs per slice-service. As in the previous example, the PON slice capacity is proportional to the number of PON ports allocated within an OLT. For instance, PON ports 1-4 are mapped to customer 1, PON ports 5-8 are mapped to customer 2. PON ports 9-14 are mapped to customer 3, and PON ports 15-16 are mapped to customer 4.

Accordingly, FIG. 8 shows the TDO maps a different PON transport network slice for each customer. A customer could be a service provider. For example, it could be a carrier or an external provider such as an industry vertical specific service provider working with a carrier FIG. 9 shows an example in which multiple services per slice are allocated with redundancy. For instance, a second group acts as redundancy for a first groups. In a max configuration, there are 4096 (4K) VLANS per OLT, two groups, five service types per slice, and 819 slices with 200 Mbps each.

With respect to the first group (Group ID 1), the example allocation of FIG. 8 shows a region X with OLT1. The group also includes slices 1-410, PON ports 1-8, NNI ports 1-2, and five VLANs (each mapping to a service). This example configuration supports 400 customers with about 200 Mbps per customer (80 Gbps total, 200 Mbps*400).

With respect to the second group (Group ID 2), the example allocation of FIG. 8 shows a region X with OLT1. The group also includes slices 411-819, PON ports 9-16, NNI ports 3-8, and five VLANs (each mapping to a service). This example redundancy also supports 400 customers with about 200 Mbps per customer (80 Gbps total, 200 Mbps*400).

FIG. 9 also shows that a first service provided is assigned a first set of VLANs. Likewise, a second service provider is assigned a second set of VLANs.

Figure 10:
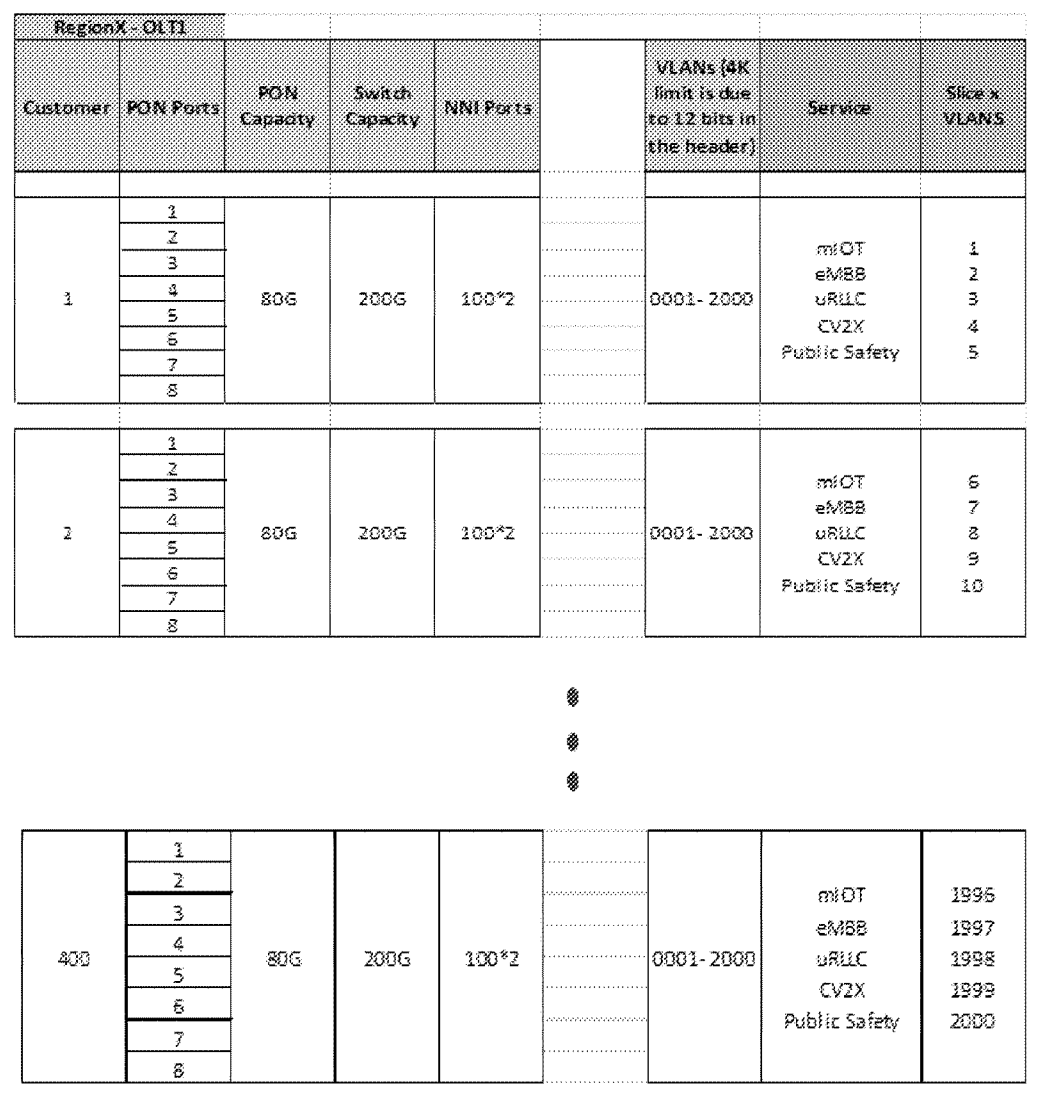

FIG. 10 and FIG. 11 show examples of single customers mapped to an individual slice with five services. FIG. 10 and FIG. 11 also show that the TDO maps 5G services that belong to a specific slice and/or across slices to a given customer that could be a service provider and have unique VLAN IDs assigned to each of these customer slices and slice-specific services.

For example, FIG. 10 shows an example snapshot of single customers mapped to individual slices with five services per slice. As explained below with reference to FIG. 11, there are a total of 4096 ($2^{12}$) VLANs. Each service, therefore, maps to a unique VLAN. In this example, the VLANs map to 819 customers per 16-port OLT.

FIG. 11 shows an example allocation along the lines shown in FIG. 10. In this example, there may be multiple regions (X), vendors (Y), and OLTs (Z); groups 1 and 2; slices 1-819; and service VLAN 1-4095. The split ratio for an XGS-PON is 1:64 to accommodate 410 slices. With one XGS-PON port to 64 split, eight XGS-PON ports is 512 (8×(1:64)) endpoints (ONTs). This amounts to 80 Gbps capacity (8×10 Gbps). Assuming 200 Mbps peak throughput/slice, this configuration supports 400 slices, five VLANs per slice, with a total 2K VLANs per group (group 1: 1-2048 VLAN IDs; group 2: 2049-4096 VLAN IDs).

Accordingly, for region (1), vendor (1), OLT (1), group (1), and slice (1), the five service VLANs are 1-5. For region (1), vendor (1), OLT (1), group (1), and slice (410), the five service VLANs are 2046-2050. For region (1), vendor (1), OLT (1), group (2), slice (411), the five service VLANs are 2051-2055. For region (1), vendor (1), OLT (1), group (2), and slice (819), the five service VLANs are 4091-4095.

FIG. 12 shows an example allocation in which there are multiple OLTs in a region sharing a common vendor. These could also be multi-vendor OLTs deployed in a given geographic region with suitable identity in the form of OLT ID (Region—Vendor—Unit ID).

Specifically, FIG. 12 shows a single vendor with two OLTs. Eight ports at 10 Gbps equates to 80 Gbps net capacity. Assuming there is 400 Mbps Peak throughput per slice, then this configuration supports 200 slices with five VLANs per slice, and a total of 2K VLANs per OLT. In this example, one XGS-PON port has 32 split, so eight XGS-PON ports amount to 256 (8×(1:32)) endpoints (ONTs). This XGS-PON split ratio of 1:32 accommodates the 205 slices shown in FIG. 12.

Accordingly, for OLT (Z), group (1), the slice IDs are 1-205 and VLAN IDs are 1-1025. And for group (2), the slice IDs are 206-410 and VLAN IDs are 1026-2050. Likewise, for OLT (A), group (1), the slice IDs are 411-615 and VLAN IDs are 2051-3075. And for group (2), the slice IDs are 615-819 and VLAN IDs are 3076-4095.

As the number of OLTs increase in the region under the same vendor, the service VLANs will be split up between the OLTs. Each slice can now cater to higher bandwidth (400 Mbps per slice).

FIG. 13 shows an example of unique VLAN mapping per slice-service. The mapping model can be extended to N slices for a given customer/service provider in their operating network domain.

FIG. 14 shows and example of VLAN tagging per slice using two VLAN tags. The mapping model can be extended to N slices for a given customer/service provider in their operating network domain.

Figure 15:
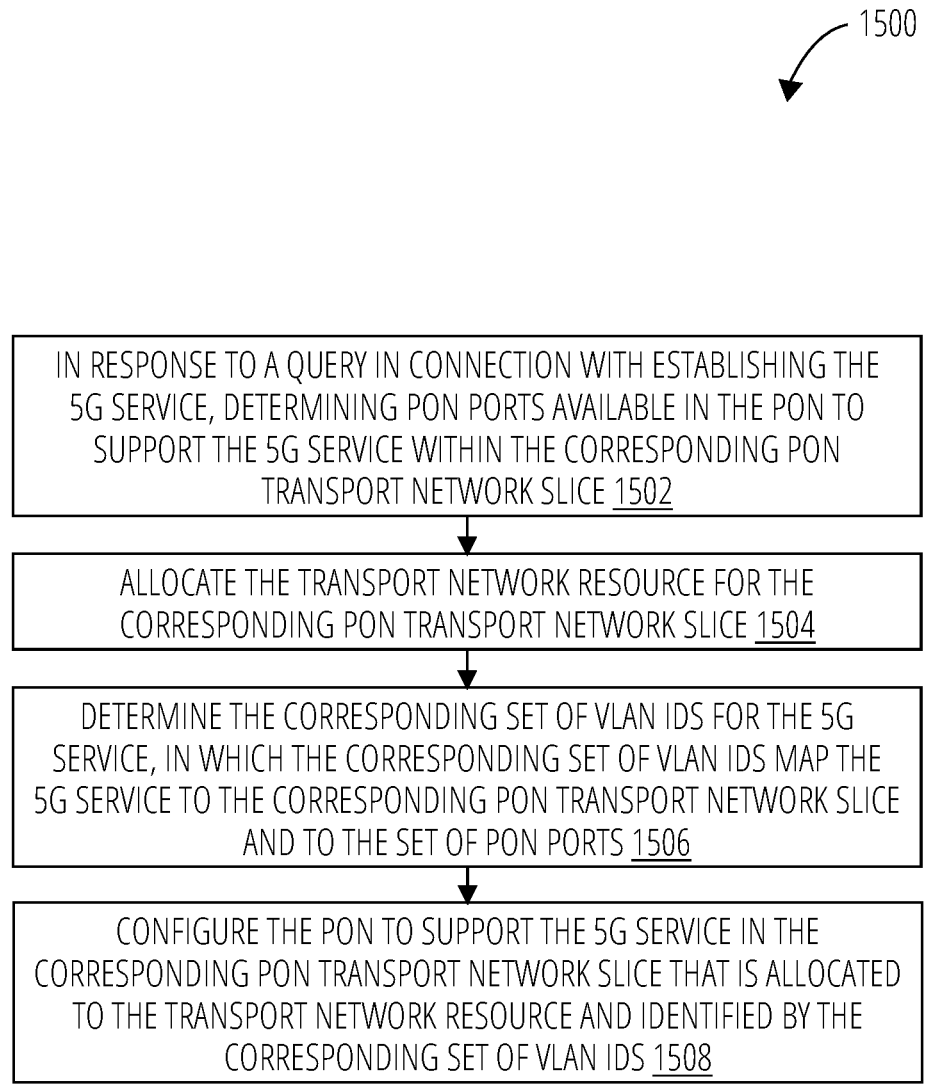
FIG. 15 is a flow diagram of a process, in accordance with one embodiment.

FIG. 15 shows a process 1500, performed by a TDO in communication with a PON in a 5G network, of dynamic configuration of a transport network resource and of a corresponding set of VLAN IDs to support a 5G service within a corresponding PON transport network slice, the transport network resource including a set of PON ports. In block 1502, process 1500 in response to a query in connection with establishing the 5G service, determining PON ports available in the PON to support the 5G service within the corresponding PON transport network slice. In block 1504, process 1500 allocates the transport network resource for the corresponding PON transport network slice. In block 1506, process 1500 determines the corresponding set of VLAN IDs for the 5G service, in which the corresponding set of VLAN IDs map the 5G service to the corresponding PON transport network slice and to the set of PON ports. In block 1508, process 1500 configures the PON to support the 5G service in the corresponding PON transport network slice that is allocated to the transport network resource and identified by the corresponding set of VLAN IDs.

Process 1500 may further include monitoring utilization of the transport network resource to ensure uniform loading.

Process 1500 may further include monitoring the corresponding set of VLAN IDs for tagging of upstream and downstream flows.

Process 1500 may further include mapping a unique VLAN ID per slice-service pair.

Process 1500 may further include mapping a different PON transport network slice for each 5G service.

Process 1500 may further include mapping a different PON transport network slice for each customer.

Process 1500 may further include allocating being based on first and second groups of PON ports, in which the second group acts as a redundant group for the first group.

Process 1500 may further include the 5G service being one of multiple 5G services, and process 1500 further includes mapping the multiple 5G services to each customer and associating different sets of VLAN IDs to each customer.

Process 1500 may further include the PON having multiple OLTs. Process 1500 may further include extracting a net available OLTs serving a given region via API calls exchanged with a PON management controller for the OLTs. Process 1500 may further include the API calls requesting analytics information such as at least one PON parameter including any one of PON ports per vendor specific OLT platform, port types per OLT, PON slices per OLT, endpoints served per PON port, traffic carried by endpoints, services supported per slice, VLANs allocated per slice-service pair and infrastructure performance behaviors per slice.

Figure 16:
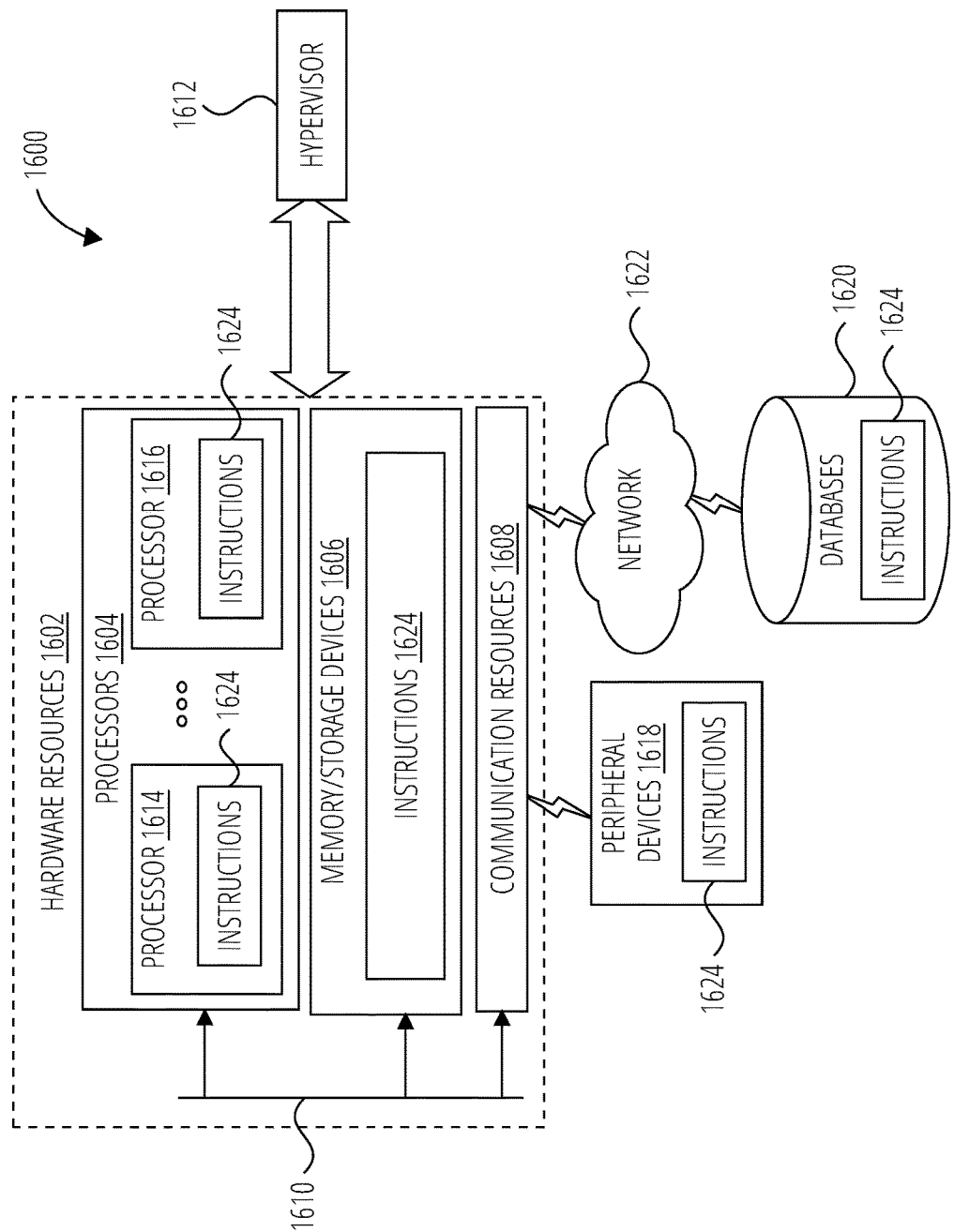
FIG. 16 is a block diagram of computing components for performing the disclosed procedures, in accordance with one embodiment.

FIG. 16 is a block diagram illustrating components 1600, according to some example embodiments, able to read instructions from a machine-readable or computer-readable medium (e.g., a non-transitory machine-readable storage medium) and perform any one or more of the methods discussed herein, such as process 500 (FIG. 5) and process 1500 (FIG. 15).

Specifically, FIG. 16 shows a diagrammatic representation of hardware resources 1602 including one or more processors 1604 (or processor cores), one or more memory/storage devices 1606, and one or more communication resources 1608, each of which may be communicatively coupled via a bus 1610. For embodiments where node virtualization (e.g., NFV) is utilized, a hypervisor 1612 may be executed to provide an execution environment for one or more network slices/sub-slices to utilize hardware resources 1602.

Processors 1604 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor 1614 and a processor 1616.

Memory/storage devices 1606 may include main memory, disk storage, or any suitable combination thereof. Memory/storage devices 1606 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 1608 may include interconnection or network interface components or other suitable devices to communicate with one or more peripheral devices 1618 or one or more databases 1620 via a network 1622. For example, communication resources 1608 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1624 may comprise software, a program, an application, an applet, an app, or other executable code for causing at least any of processors 1604 to perform any one or more of the methods discussed herein. Instructions 1624 may reside, completely or partially, within at least one of processors 1604 (e.g., within the processor's cache memory), memory/storage devices 1606, or any suitable combination thereof. Furthermore, any portion of instructions 1624 may be transferred to hardware resources 1602 from any combination of peripheral devices 1618 or databases 1620. Accordingly, the memory of processors 1604, memory/storage devices 1606, peripheral devices 1618, and databases 1620 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method, performed by a transport domain orchestrator (TDO) in communication with a passive optical network (PON) in a 5G network, of dynamic configuration of a transport network resource and of a corresponding set of VLAN IDs to support a 5G service within a corresponding PON transport network slice, the transport network resource including a set of PON ports, the method comprising:

in response to a query in connection with establishing the 5G service, determining PON ports available in the PON to support the 5G service within the corresponding PON transport network slice;

allocating the transport network resource for the corresponding PON transport network slice;

determining the corresponding set of VLAN IDs for the 5G service, in which the corresponding set of VLAN IDs map the 5G service to the corresponding PON transport network slice and to the set of PON ports; and configuring the PON to support the 5G service in the corresponding PON transport network slice that is allocated to the transport network resource and identified by the corresponding set of VLAN IDs.

2. The method of claim 1, further comprising monitoring utilization of the transport network resource to ensure uniform loading.

3. The method of claim 1, further comprising monitoring the corresponding set of VLAN IDs for tagging of upstream and downstream flows.

4. The method of claim 1, further comprising mapping a unique VLAN ID per slice-service pair.

5. The method of claim 1, further comprising mapping a different PON transport network slice for each 5G service.

6. The method of claim 1, further comprising mapping a different PON transport network slice for each customer.

7. The method of claim 1, in which the allocating is based on first and second groups of PON ports, in which the second group acts as a redundant group for the first group.

8. The method of claim 1, in which the 5G service is one of multiple 5G services, and the method further comprises mapping the multiple 5G services to each customer and associating different sets of VLAN IDs to each customer.

9. The method of claim 1, in which the PON includes multiple optical line terminals (OLTs).

10. The method of claim 9, further comprising extracting a net available OLTs serving a given region via API calls exchanged with a PON management controller for the OLTs.

11. The method of claim 10, in which the API calls request analytics information comprising at least one PON parameter including any one of PON ports per vendor specific OLT platform, port types per OLT, PON slices per OLT, endpoints served per PON port, traffic carried by endpoints, services supported per slice, VLANs allocated per slice-service pair and infrastructure performance behaviors per slice.

12. A non-transitory computer-readable storage medium of a transport domain orchestrator (TDO) for passive optical network (PON) in a 5G network, the computer-readable storage medium providing for dynamic configuration of a transport network resource and of a corresponding set of VLAN IDs to support a 5G service within a corresponding PON transport network slice, the transport network resource including a set of PON ports, the computer-readable storage medium including instructions that when executed by TDO cause the TDO to:

in response to a query in connection with establishing the 5G service, determine PON ports available in the PON to support the 5G service within the corresponding PON transport network slice;

allocate the transport network resource for the corresponding PON transport network slice;

determine the corresponding set of VLAN IDs for the 5G service, in which the corresponding set of VLAN IDs map the 5G service to the corresponding PON transport network slice and to the set of PON ports; and configure the PON to support the 5G service in the corresponding PON transport network slice that is allocated to the transport network resource and identified by the corresponding set of VLAN IDs.

13. The computer-readable storage medium of claim 12, in which the instructions further configure the TDO to monitor utilization of the transport network resource to ensure uniform loading.

14. The computer-readable storage medium of claim 12, in which the instructions further configure the TDO to monitor the corresponding set of VLAN IDs for tagging of upstream and downstream flows.

15. The computer-readable storage medium of claim 12, in which the instructions further configure the TDO to map a unique VLAN ID per slice-service pair.

16. The computer-readable storage medium of claim 12, in which the instructions further configure the TDO to map a different PON transport network slice for each 5G service.

17. The computer-readable storage medium of claim 12, in which the instructions further configure the TDO to map a different PON transport network slice for each customer.

18. The computer-readable storage medium of claim 12, in which the allocation of the transport network resource is based on first and second groups of PON ports, in which the second group acts as a redundant group for the first group.

19. The computer-readable storage medium of claim 12, in which the 5G service is one of multiple 5G services, and in which the instructions further configure the TDO to map the multiple 5G services to each customer and associating different sets of VLAN IDs to each customer.

20. The computer-readable storage medium of claim 12, in which the PON includes multiple optical line terminals (OLTs).

21. The computer-readable storage medium of claim 20, in which the instructions further configure the TDO to extract a net available OLTs serving a given region via API calls exchanged with a PON management controller for the OLTs.

22. The computer-readable storage medium of claim 21, in which the API calls request analytics information comprising at least one PON parameter include any one of PON ports per vendor specific OLT platform, port types per OLT, PON slices per OLT, endpoints served per PON port, traffic carried by endpoints, services supported per slice, VLANs allocated per slice-service pair and infrastructure performance behaviors per slice.

* * * * *